United States Patent
Kohler

[11] 3,883,633
[45] May 13, 1975

[54] COMMUTATORLESS MOTOR
[75] Inventor: Wolfgang Kohler, Berlin, Germany
[73] Assignee: Akademie der Wissenischaften der DDR, Berlin, Germany
[22] Filed: Feb. 4, 1974
[21] Appl. No.: 438,985

[52] U.S. Cl. ............... 310/152; 310/12; 310/40; 310/154; 310/181; 310/268; 318/138; 318/254
[51] Int. Cl. .......................................... H02k 29/02
[58] Field of Search ..... 310/12, 13 AG, 40, 40 MM, 310/152, 154, 168, 181, 268, DIG. 6; 318/138, 259

[56] References Cited
UNITED STATES PATENTS

| | | | |
|---|---|---|---|
| 3,134,220 | 5/1964 | Meisner | 318/254 X |
| 3,159,760 | 12/1964 | Olofson | 310/268 X |
| 3,242,404 | 3/1966 | Favre | 310/168 X |
| 3,265,911 | 8/1966 | Madsen | 310/12 |
| 3,315,106 | 4/1967 | Reynst | 310/154 X |
| 3,402,333 | 9/1968 | Hayner et al. | 318/254 X |
| 3,531,709 | 9/1970 | Nazare | 310/181 X |
| 3,558,947 | 1/1971 | Burr | 310/154 |
| 3,566,251 | 2/1971 | Hoglund | 310/181 X |
| 3,599,050 | 8/1971 | Komatsu | 318/254 X |
| 3,766,456 | 10/1973 | Carow | 318/254 X |

Primary Examiner—Mark O. Budd
Attorney, Agent, or Firm—Nolte and Nolte

[57] ABSTRACT

A commutatorless motor having a stator comprised of field poles of constant magnetic field arranged with alternate polarities. One or more coupling coils are arranged between adjacent stator field poles, and an AC voltage source for controlling the motor is connected to such coupling coils. The motor has an iron-free rotor provided with drive coils, with rectifying devices being connected to the drive coils to permit only one direction of current flow therethrough. The coupling coils on the stator provide the only source for driving energy for the rotor, and the rotor coils serve to couple the driving energy to the rotor and as control coils for the rotor. Separate rectifying devices may be provided for each of the drive coils, or alternatively, a single rectifying device may be provided for a group of the rotor drive coils.

21 Claims, 19 Drawing Figures

COMMUTATORLESS MOTOR

The present invention is directed to commutatorless motors, and is particularly directed to the provision of a motor of this type having an iron-free rotor including drive coils and rectifying means connected to the drive coils, and a stator having field poles of constant magnetic strength arranged with alternate polarity and additional poles arranged between at least one pair of the field poles of constant magnetic strength and controlled by an AC voltage source to exhibit alternating magnetic polarities.

It is known that commutatorless motors are more efficient than motors having commutators, especially low power motors, due to the resultant decrease in friction losses. For the same reason it is desirable to avoid the use of slip rings, wherever possible.

In order to obviate the necessity for a commutator, various arrangements have been devised for replacing the commutator by a plurality of electronic switches, such arrangements being constructed according to the assumption of successive activation of the electronic switches to effect the commutation. A large number of different types of controllable elements may be employed as the electronic switches, such elements usually also being unidirectional devices in order to control the direction of current flow in the windings. The number of electronic switches employed in the past generally is equal to the number of windings. In some cases, however, arrangements have been provided in which two or more windings have been suitably interconnected with a common electronic switch.

In commutatorless motors of the above type, the electronic switches must be activated in suitable fashion, and in the past many different methods have been suggested for the proper activation of the switches. For example, simplified low friction electro-magnetical commutators, magnetically coupled control windings, optical systems having light sources and photo elements, and hall elements and other magnetically controlled semi-conductor components, as well as other suitable devices, have been investigated for their suitability in the activation of the switches. Such devices have also been especially developed to serve this function.

In the selection of the type of electronic switches to be employed and the method of activation of the switch, the requirements such as efficiency, output, number of revolutions, and stability of operation must be considered and balanced against the costs of such arrangements, such as production labor costs as well as costs of the components themselves.

Since components especially designed for use in commutatorless motors may have no other essential application, such devices are relatively expensive due to the low production of such components. It is consequently preferable to employ conventional devices such as diodes, transistors, thyristors and other similar rectifying electronic switches, and to control such devices by supplemental windings unless they can be controlled directly by magnetic fields.

In most arrangements the stator coils of the motors are employed as the drive coils, so that current may be supplied thereto without difficulty. In such arrangements the switches are also fixedly mounted. Rotating permanent magnets on the rotor assembly are provided to control the switches either by way of supplemental control windings or by directly magnetically influencing the switches, since the magnetic fields of the permanent magnets alternates with respect to the stationary components of the motor. If on the other hand the drive coils are provided on the rotor assembly, these rotating coils may be supplied with energy by way of slip rings, or if economically permissible, by way of rotating transformers. In this case, the rotating transformers also supply an AC voltage to supplemental circuits. In this way the driving power may be transformed so that, for all practical purposes, AC motors operating on known principles are provided. Alternatively, the driving power coupled by way of the rotating transformer may be rectified so that it is again available as a direct current.

In the past, in order to keep the costs of such motors having iron-free drive coils within tolerable limits while providing motors capable of operating at the desired fast and constant rates, commutatorless motors have been suggested which function in a manner similar to squirrel cage rotor motors. In such motors, however, the short circuit behavior of the rotor is controlled by employing controlled rectifiers for the electronic switches. This arrangement necessitates only the transmission of the AC control voltage to the rotor by way of a simple rotating transformer. Alternatively, the rotating transformer may be replaced by a capacitive transmission device if sensitive components are employed and the output of the motor is sufficiently low. The controlled rectifiers, which may be transistors, are wired so that their controlled collector-emitter circuits are in parallel with the various drive coils. All of the controlled rectifiers are activated in phase by the control circuits of these transistors, the control circuits being wired in parallel to a single transformer winding. The stator of such motors consists of stator field poles having constant magnetic intensity arranged with alternating polarity, and alternating field poles supplied by an AC voltage source having a frequency that is high with respect to the frequency of rotation of the motor. The frequency of the AC voltage source must be the same as the control frequency, and of constant phase position. A change in phase position (i.e. phase reversal) results in a change in the direction of rotation of the rotor. In such arrangements vibrators may be provided for the generation of the AC voltage.

The latter described motor also represents a compromise between performance and costs. A separate controlled rectifier must be provided for each winding. The rotating transformer must be uncoupled from the magnetic circuits of the motor, and in addition to the increased cost in the provision of such a transformer, the transformer requires additional space. Further, in view of the drive principle that is employed in such motors, the efficiency is lower than that which is attainable from other types of commutatorless motors.

It is therefore the object of this invention to provide a commutatorless motor that overcomes the above disadvantages and is as inexpensive to produce as possible.

In the provision of a motor in accordance with the invention, it is desirable to provide a motor that is capable of operating over a wide range of speeds without significant speed fluctuations. The invention is further directed to the provision of a motor that is capable of miniaturization, in which the material costs and labor costs are low, and which is adaptable for use with motors of widely different output ranges, for example from milliwatt rated motors to kilowatt rated motors. Furthermore, the invention is directed to the provision of a motor which does not require the use of specially designed components or special precision or technology in its production. Further, the invention is directed to the provision of such a motor which may be designed so that the manual production labors are minimized. It is thus evident that the invention is directed to the solution of complex problems which, by traditional standards, include partly contradictory requirements.

Briefly stated, in accordance with the invention, a commutatorless motor is provided in which the stator is provided with stator poles of constant magnetic strength arranged with alternate polarities, and coupling coils are provided on the stator. The AC voltage source is connected solely to these coupling coils, whereby the coupling coils serve as the driving source of energy for the motor. The coils on the rotor are solely drive coils. Rectifying means are provided on the rotor, with either a single rectifying device being coupled to each rotor coil or each rectifying device being connected in common to a group of rotor coils. The rotor coils serve as coils for coupling the energy from the coupling coils, as well as serving a control function in the operation of the motor.

In one form of a commutatorless motor in accordance with the invention, the stator is comprised of a substantially closed ring of field poles of constant magnetic strength. For example, it is preferred that the ring be of an oxidized ceramic magnetic material. One or more relatively small stator poles are provided in the stator in the boundaries between poles of opposite polarity, the small stator poles being adapted to be energized to provide an alternating magnetic field. Preferably, the small stator poles are comprised of coils wound on ferrite cores.

When conventional rectifying devices, such as diodes or transistors are employed as the electronic switches, in accordance with the invention it is possible to interconnect the rectifying means and the rotor coils in an advantageously simple circuit whereby two coils or coil groups of the rotor may have one direct interconnection and the second interconnection by way of the rectifying device. When controlled rectifying devices are employed, one of the coils or coil groups of interconnected coils always controls the rectifying device by way of both coils or coil groups.

In accordance with a further embodiment of the invention, an AC voltage source for the commutatorless motor may be in the form of one or more high frequency generators having load dependent current for efficient operation. In this arrangement, the coils of the generator are preferably wound on the small stator poles to provide the alternating polarity field. This arrangement may be designed specifically in order to obtain optimum efficiency of operation. The frequency transformation, i.e. with respect to the generator frequency and the rotation frequency of the motor, may also be selected to obtain the maximum efficiency in the operation of the motor.

The efficiency of the motor in accordance with the invention is of course also influenced by the provision of suitable magnetic return paths for the magnetic circuits. With this in mind, and in order to employ technologically simple production techniques, the stator, which may be stamped, molded, cast, or formed by similar methods from a ferrite material, is designed to form the motor housing as well as the magnetic return path. The stator field poles of constant magnetic strength, which are preferably formed of an oxidized ceramic material, are inserted in the stator structure, preferably being cemented or pressed therein.

The arrangement of the coupling coils on the stator poles having fields of alternating polarity also have a great influence on the efficiency of the motor. These poles should be positioned as close as possible to the rotor coils, and the faces of the pole cores should lie in a common plane, in order that the return path for the alternating flux field of the pole cores encloses the rotor coils. In this manner, the stray fields may be minimized.

A single AC voltage source may be advantageously connected to the coupling coils of several diametrically opposed alternating field stator poles, it being preferable that the source be connected to the coils of two such poles. This not only decreases the wiring cost of the motor, but it also improves the stability of operation of the motor. As a consequence, rotor imbalances resulting from production tolerances may be equalized. In embodiments of the invention having large outputs, it is desirable to provide several AC voltage sources, with the number of alternating fields stator poles being two or more times the number of AC sources. With such large output motors it is preferable to provide an alternating field stator pole at the boundary between each pair of stator poles of constant magnetic strength.

In order to enable the selection of the direction of rotation of the rotor, it is desirable to provide means for selectively connecting or switching the AC voltage sources to the coupling coils arranged between the boundaries of the different constant field stator poles.

The speed of a motor in accordance with the invention may be controlled by such known means as an analog or digital direct current or a resistance regulator for the alternating voltage source. In order to enable the control of the motor to rotate in different directions, several AC voltage sources may be provided, with different sources corresponding to different directions of rotation, and being connectable with the coupling coils by suitable switching means.

In a known manner, the rotor may be provided with two or more overlapping drive coils. Rectifying means, in accordance with the invention, are connected to such drive coils in the above described manner. The rotor dimensions are not determined by the operating voltage of the motors so that the same rotors may be employed in motors having different operating voltages.

If the rectifying means are diodes, it is preferable that the diodes have high breakdown voltages. While this may seem undesirable, from the standpoint of efficiency, such high breakdown voltage diodes reduce the breaking moments of the induced electromotive force, so that in effect the efficiency is improved as compared to arrangements in which the diodes have low breakdown voltage. It is more desirable, however, to employ controlled rectifiers for the rectifying means. The controlled rectifiers may be transistors with their collectors and emitters connected in anti-parallel fashion to coils or groups of coils. The common connection of such coils or groups of coils is connected to the base electrodes of the transistors, preferably by way of current limiting resistors.

Such components provide properties similar to those of symmetrical bipolar transistors, which may also be employed in the circuit. These transistors may be employed in the same manner, connected between two coils or groups of coils with their bases connected to the common point of the coils or groups of coils by way of a resistor. This arrangement reduces the cost of the system, while providing the same degree of efficiency. When motors of even larger output are to be produced, thyristors and similar control rectifiers may be employed as the rectifying means, in known manner.

Phase shifting means, such as supplemental coils, may be connected between the coils or groups of coils and the rectifying means. Such phase shifting means are preferably connected in the lead from the coils or groups of coils to the control electrode of the rectifiers, for example in series with the above discussed base current limiting resistors, in order to improve the efficiency of the rectifiers. Alternatively, the supplemental coils may replace the base current resistors.

The rectifying arrangement, in accordance with the invention, may be in the form of an integrated component including the rectifiers required for each coil or group of coils. Such an integrated component may be in the form of a disc or ring, and is preferably mounted on or in the rotor.

Further, the rotor coils may be in the form of a printed circuit, this technique being otherwise only partially possible in this type of motor due to the use of the coupling and control coils.

Since the motor in accordance with the invention operates on a simple principle, there are many conventional as well as novel techniques that may be employed in the production of the motor. For example, as discussed above, the stator may be made of a magnetically conductive low loss material. It may be simply and inexpensively produced by providing the stator motor housing in the form of two identical cups, with a disc shaped rotor being positioned between single piece alternating field pole cores, which are slightly shorter than the cups and are mounted within the cups. Equally short permanent magnetic rings may be mounted in the cups, the ring having recesses for receiving the alternating field poles. In this arrangement it is possible to produce the entire stator housing assembly in two halves in a single die. It is necessary only to align one side of each of the paths in order to provide the exact size of the air gap required. The constant or permanent field magnetic poles are produced in the usual manner.

Each of the cup shaped housing parts may contain a shaft bearing, or be designed to accommodate such a bearing. The rectifying means on the rotor, as well as other components such as a tachometer and DC voltage generators, may be mounted in pole recesses, having approximately the same diameter as the shaft bearings.

The stator housing cups may also contain recesses for the AC voltage generator components, as well as the connections for these components, the components being located outside of the necessary magnetic return path portions of the cups. With this arrangement, the only leads that are necessary for the motor are those required for the DC supply, and if applicable, for an AC supply, and leads that may be employed for setting the nominal value of the regulating system.

In order that the invention may be more clearly understood, it will now be disclosed in greater detail with reference to the accompanying drawings, wherein.

Figures 1, 2, 3:
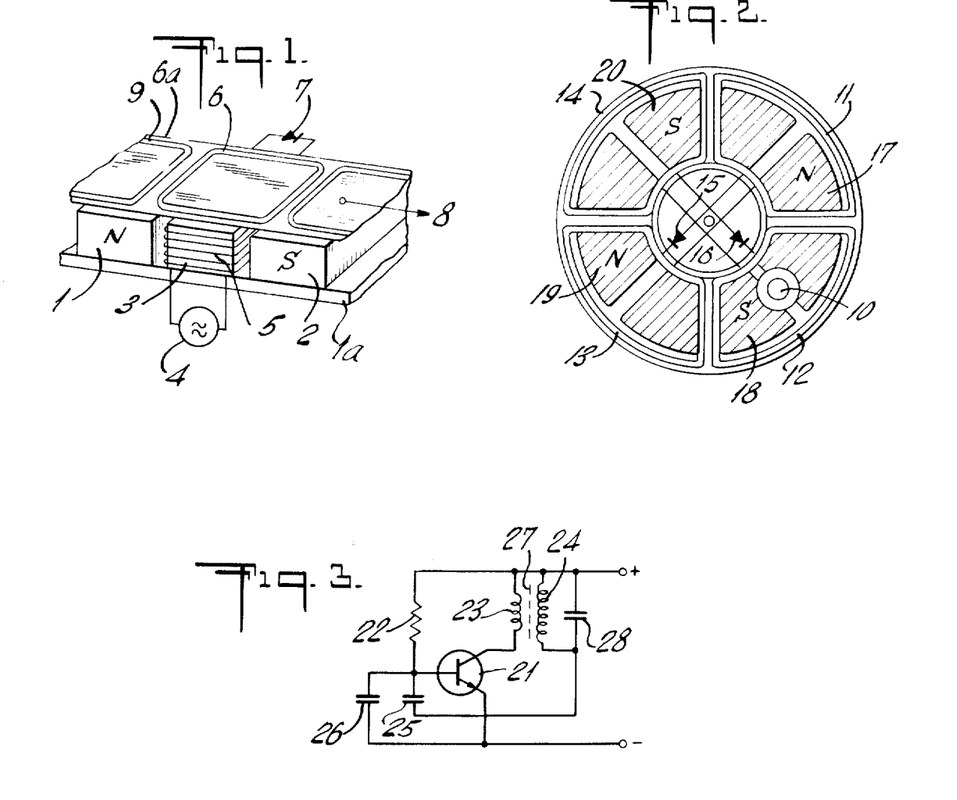
FIG. 1 is a simplified perspective sketch illustrating the drive principle in accordance with the invention.
FIG. 2 is a plan view of a commutatorless motor in accordance with the invention, showing the adaptation of the drive principle of FIG. 1 to a rotary motor.
FIG. 3 is a circuit diagram of one embodiment of a generator for energizing the alternating field stator poles.

Referring now to the drawings, and more in particular to FIG. 1, therein is illustrated in simplified perspective form an assemblage of components for explaining the drive principle of a commutatorless motor in accordance with the invention. In this figure, a pair of permanent or constant magnetic strength field poles 1 and 2 are mounted in spaced apart relationship with their magnetic polarities directed in opposite directions. An alternating magnetic field pole 3 is positioned between the field poles 1 and 2. An alternating current voltage source 4 is connected to a field coil 5 on the pole 3. A drive coil 6 is positioned above the poles 1, 2 and 3, this coil being connected to a rectifier 7, the rectifier being connected for example in series with the turns of the coil 6. The drive coil 6, as well as further drive coils 8 and 9 are mounted on a suitable support 6a, and the coils 1, 2 and 3 are mounted on a suitable support 1a. In outward appearance the arrangement of FIG. 1 resembles the known arrangement of a linear motor, with the exception that the drive coil 6 is sufficiently large to cover one constant magnetic strength field pole and at least a part of the alternating polarity field poles 3. In this arrangement, the alternating field from pole 3 induces a current in the coil 6, one polarity of the current being supressed by the rectifier 7. The rectified alternating current in the drive coil 6 generates a constant polarity field which, according to the arrows 8 in FIG. 1, effects the motion of the drive coil 6 from the north pole 1 to the south pole 2 until the next drive coil 8, shown only in part in FIG. 1, continues the same motion of the drive assembly.

The three poles 1, 2 and 3 illustrated in FIG. 1, and the drive coils of the type illustrated, which are successively mounted on the rotor and connected to rectifiers, are sufficient in order to provide constant motion of the drive assembly. It is unnecessary to provide each of the drive coils with a separate rectifier, as will be explained in greater detail in the following paragraphs, and thus groups of coils may be connected to a common rectifier so that as few as two rectifiers connected in parallel to opposite coils or between such coils are sufficient in accordance with the invention.

FIG. 2 illustrates in simplified form an elevational view of a motor in accordance with the invention, in order to further illustrate the drive principle of the motor. This arrangement shows four drive coils 11, 12, 13 and 14 positioned with equal relative spacing above four permanent or constant magnetic strength poles 17, 18, 19 and 20. It may be assumed, for example, that the poles 17-20 are fixedly mounted and form stator poles, and that the coils 11-14 are rotor coils suitably mounted for rotation about a central axis normal to the plane of the drawing. In this arrangement a rectifier 15 is connected between opposite coils 11 and 13, and a rectifier 16 is connected between opposite coils 12 and 14. Consequently, half wave current flows through the interconnected coils 11 and 13 by way of the rectifier 15, and half wave current flows through the coils 12 and 14 by way of the rectifier 16. The interconnected coils thus contribute jointly to the drive motion in the motor if the field poles 17-20 are coordinated with the coils. In the arrangement of FIG. 2, a pole 10 of alternating polarity magnetic field is positioned between a pair of adjacent poles 17 and 18. Contrary to prior arrangements, however, poles of alternating polarity must not be located between all field poles of constant magnetic strength, since this would result in the generation of opposing motive forces in the drive coils. Thus, in the arrangement of FIG. 2, an additional alternating polarity magnetic field pole could be provided between the field poles 19 and 20, to aid in the rotation of the drive coils in the same direction. If alternating polarity magnetic poles were to be provided between the other field poles, the opposite direction of motion and rotation would result. Consequently, in the arrangement of the present invention, only the sequence of poles from north to south and south to north determines the direction of rotation of the drive coils, and not the phase position of the alternating current voltages, as in known commutatorless motor arrangements. The arrangement of the present invention thus enables the simple regulation and speed control which can be developed, and permits rapid stopping of the motor by switching of the energization of the motor to other alternating magnetic polarity poles. The frequency of the alternating voltage may be freely selected from the standpoint of good efficiency, and it is not necessary to vary this frequency.

Even through it is necessary to provide only a single alternating polarity field pole, as shown in FIG. 2, it is advantageous to provide a second such pole disposed diagonally with respect to the first pole, in order to provide improved compensation for imbalances of the drive coil windings, and to insure the generation of a more uniform torque.

For the same reason, and especially in order to assure starting of the motor even when the drive coils are disposed in unfavorable positions, it is advantageous to stagger to the drive coil systems with respect to each other by half the angle of their coils. In this arrangement, the second drive coil system generates its greatest torque when the torque of the first drive coil system is at its minimum. In simple motors, however, this second system is not necessary since production imbalances always impart an unbalanced moment to a drive coil to assure starting of the motor, at least under no load conditions.

Surprising as it may seem, it has been proven that the most advantageous supply for the alternating polarity field poles is a simple AC voltage generator in the form of a sign wave generator having load dependent current. An example of such a circuit is shown in FIG. 3. In this arrangement, initially current flows through the base-emitter path of the transistor 21 by way of the resistor 22. As a consequence, collector current of the transistor flows through the coil 23, and is induced in a frequency determining coil 24 coupled to the coil 23. A capacity voltage divider consisting of a capacitor 25 of small capacitance and a capacitor 26 of relatively higher capacitance feeds back a portion of the tank circuit voltage to the base of the transistor 21, thereby blocking the base current until the cycle repeats itself. The ferrite core 27 on which the coils 23 and 24 are wound forms the alternating polarity field pole for the motor, for example the pole 10 of FIG. 2 or the pole 3 of FIG. 1. The energy taken therefrom determines the current for the next pole reversal, i.e., the load dependent supply current. The frequency determining capacitor 28, connected in parallel with the coil 24, fixes the recharging speed which governs the efficiency of the motor.

Figure 4:
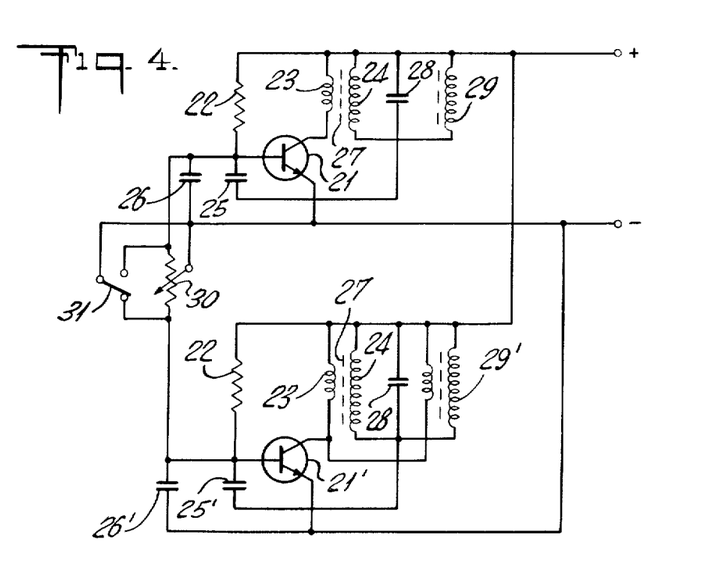
FIG. 4 is another embodiment of a generator circuit for energizing the alternating field stator poles in accordance with the invention, this circuit illustrating two forms of generators each adaptable to energize a pair of poles, and including interconnecting switch means enabling reversing of the motor.

If, as discussed above, it is desired to provide two poles of alternating magnetic polarity, the same generator may be provided to supply such poles. FIG. 4 illustrates a manner of coupling the additional poles 29 to an AC voltage generator. Reference symbols for identical elements in FIG. 4 are the same as those in FIG. 3.

In the arrangement of FIG. 4, the circuit associated with transistor 21 is arranged for energizing the motor for rotation in one direction, while the circuit associated with transistor 21' is arranged for rotating the motor in the opposite direction. Switch means 31 are provided for selecting the direction of rotation. The two circuits are somewhat different, to illustrate several forms of circuits that may be alternatively employed, and hence it is apparent that a complete circuit for the operation of motor will generally include two similar circuits rather than two different forms of circuits as illustrated.

While it is possible to employ known push-pole circuits for energizing a motor in accordance with the invention, as well as other types of simple generator circuits, it is not advisable to use such circuit in view of their lesser efficiency. This is of particular importance when the speed of the motor is to be controlled by regulating the generator. Thus, in the arrangement of FIG. 4, speed control is possible, for example, by varying the resistor between the base of the transistor 21 or 21' and the respective emitter, whereby the DC supply to the AC voltage generator is reduced almost to the same extent as the alternating current derived from the generator. In contrast to the usual modes of regulating DC operated motors, the efficiency of the system in accordance with the invention remains constantly high.

In regulated operation, the DC supply current adapts to the load, so that the power consumption under normal load conditions is very small. This is of particular importance, and represents an essential advantage of the present invention when the motor is employed in battery operated equipment, in which case it is usually necessary that the motor furnish full power only under starting conditions.

In accordance with the invention, it is also possible to employ a motor designed to run in both directions as a servo motor, by employing the above described speed control system. Such control enables control of the motor accurately to stand still conditions. A circuit enabling this type of operation is schematically illustrated in FIG. 4. In this circuit, the generator components associated with transistor 21 is employed for running the motor in a forward direction, and the generator associated with transistor 21' is employed for running the motor in the opposite direction. A variable resistor 30 is provided between the bases of the transistors 21 and 21', and the tap of this resistor is connected to the two emitters. The position of the tap determines the direction of rotation. The variable resistor 30 may also be replaced by a bridge circuit having nominal value and actual value outputs. If the tap is in the center of the bridge, or bridge balance is obtained, the same small moment acts upon the drive coils of the motor in opposite directions, thus enabling a more accurate adjustment of the motor to the nominal position, or braking in the nominal position, possible.

Digital regulating systems also enable changing the direction of the motor by means of the switch 31. Electronic switches and conventional digital components may, of course, be substituted for the switch 31. For digital speed control, only the half of the switch 31 is necessary which short-circuits or damps the base emitter circuits of the transistors 21 and 21', for example by way of a resistor.

The difference between the generator circuit of FIG. 4 associated with transistor 21 and the generator circuit associated with transistor 21' is in the manner of coupling of the additional alternating polarity field poles. Thus, in the circuit including transistor 21, only the coil 24 is coupled to the coil 23, the coil 29 coupled to the core of the additional pole being connected in parallel with the coil 24. In the circuit associated with transistor 21', however, the coil 23' has two sections, the coils 24' and 29' being coupled separately to the sections of the coil 23'. Other combinations are also of course possible, such as for example the series or mixed series and parallel arrangement of the coils with only the coupling coil 23 being provided. In view of the requirement of providing adequately high coupled AC voltages, it is only necessary to make sure that the coils have suitable transformation ratios.

The connections of the drive coils of the rotor to the rectifying means may also be effected by varying techniques, depending upon the number of poles provided, the number of coils, the number of rectifiers, and upon the type and properties of the rectifiers.

Figure 5A:
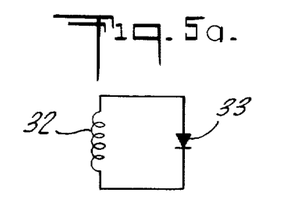
FIGS. 5a–5c are circuit diagrams of rotor circuits employing diodes as the rectifying means.
Figure 5B:
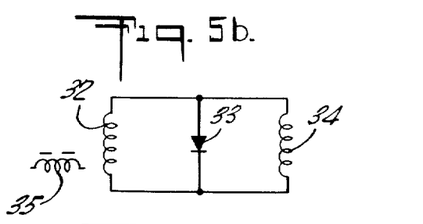
Figure 5C:
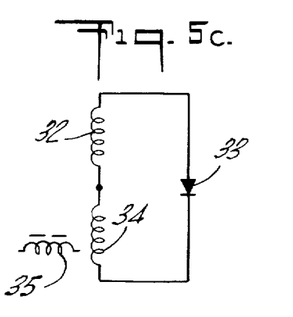

FIG. 5 illustrates three possible basic circuits that may be employed in the rotor of the motor in accordance with the invention. In FIG. 5a, each drive coil 32 is provided with a separate diode 33. In FIG. 5b, the diode 33 is connected in parallel with two drive coils 32, 34, only one of the drive coils being coupled to an alternating polarity field coil 35 at any instant. The drive coil which is not coupled to a generator coil presents a high inductive reactance to the alternating current. The series arrangement of the drive coils 32, 34 as illustrated in FIG. 5c acts in a similar manner. In this arrangement, the drive coil 34, which is shown coupled to the generator coil 35, can generate a current only in the forward direction of the diode 33, this circuit being closed by the other drive coil 32. The drive coil 32 represents a load resistance and has the same affect at the moment shown as do known arrangements having drive coils supplied by separate coupling coils. Interconnecting of the two coils is possible.

Figure 6:
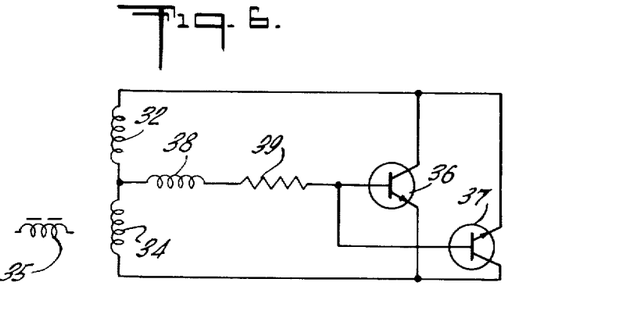
FIG. 6 is a circuit diagram for the rotor employing a pair of transistors as the rectifying means.

FIG. 6 illustrates a rotor circuit of a two pole motor employing transistors 36 and 37, the transistors being connected in anti-parallel fashion to serve as rectifying means. At the instant illustrated, the drive coil 34, of the two drive coils 32 and 34, is momentarily coupled to the generator coil 35. During one half wave of induced current, a voltage is applied to the base of transistor 36 which renders this transistor conductive, thereby enabling a half wave current to flow through both of the drive coils and through the collector-emitter path of the transistor 36. The current flows in the opposite direction through the coils and the transistor 37 when the coil 32 is coupled to the generator coil 35. A supplemental coil 38 in series in the base circuit of the transistors provides a phase shift, thereby effecting a more favorable forward time characteristic and improved efficiency. The series base resistor 39 limits the base current to a permissable value.

Figure 7:
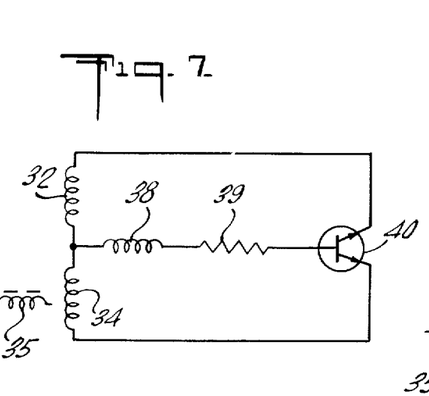
FIG. 7 is a circuit diagram of a rotor circuit employing a single bipolar transistor in combination with series connected rotor coils.

The arrangement of FIG. 7 is similar to that of FIG. 6, with the exception that a bi-polar symmetrical transistor 40 replaces the two separate transistors 36 and 37.

Figure 8:
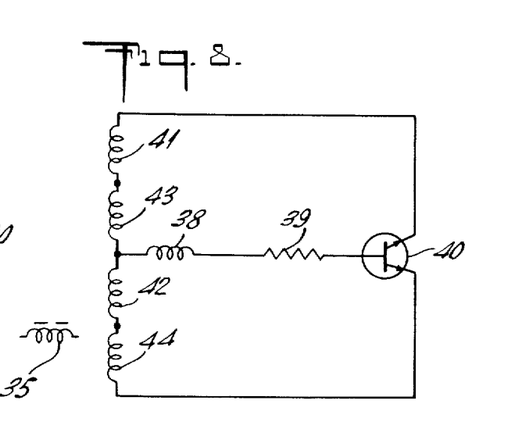
FIG. 8 is a circuit diagram of a modification of FIG. 7, employing additional rotor coils.
Figure 9:
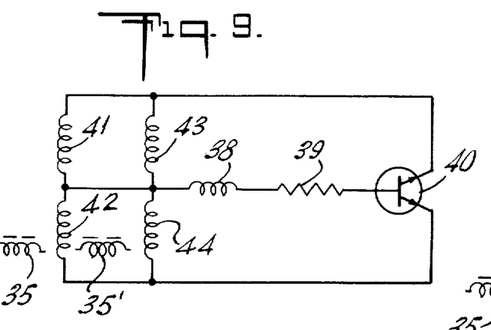
FIG. 9 is a circuit diagram of a rotor circuit employing a bipolar transistor and parallel connected rotor coils.
Figure 10:
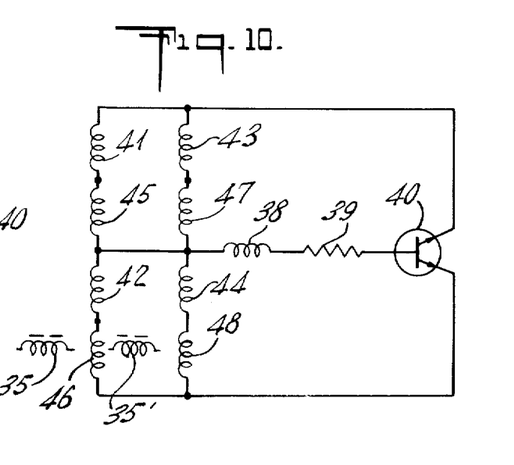
FIG. 10 is a circuit diagram of a rotor circuit employing a bipolar transistor and a series-parallel interconnection of the rotor coils.

When multi-pole motors are employed, several circuits such as illustrated in FIGS. 6 and 7 may be employed on a single rotor plate. It is also possible, however, to connect two or more coils in series, as illustrated in FIG. 8, or in parallel as illustrated in FIG. 9. Alternatively, as illustrated in FIG. 10, a combined series-parallel arrangement of the coils may be connected to the transistor 40, or in an analogous manner, to a pair of anti-parallel transistors 36, 37 in accordance with the arrangement of FIG. 6. The efficiencies of the circuits differ slightly, depending upon the design criteria employed. The rotor circuits illustrated in FIGS. 9 and 10 permit the simultaneous energization of several drive coils, as shown for example by the drive coils 35 and 35'. This provides a desirable effect on the coupling and the efficiency of the motor. In the above discussed circuits, identical elements have identical reference symbols.

For better indication of the sequence of the drive coils on the rotor plate, the rotor coils 41–48 are so numbered in FIGS. 8–10 that their appropriate sequence is recognizable on the periphery of the rotor. Analogous to their arrangement relative to the North or South pole, they must be wired so that the same rotational sense results in accordance with the above discussion. When greater numbers of poles are employed, both the series and the parallel circuit may be expanded in the same manner as above discussed.

From the standpoint of mechanical design of the motor, the invention provides not only advantages resulting strictly from the principle of operation, but also upon the structural and technological advantages which may be achieved. Some of the possible arrangements are illustrated in FIGS. 11–17. In these figures, flat rotor plates are shown to simplify the illustrations, although such arrangements also provide technological advantages. Essentially, however, all known designs of rotors are also applicable in principle to the motor of the invention, when appropriately designed. Only the essential features of the motor are illustrated and described in greater detail.

Figure 11:
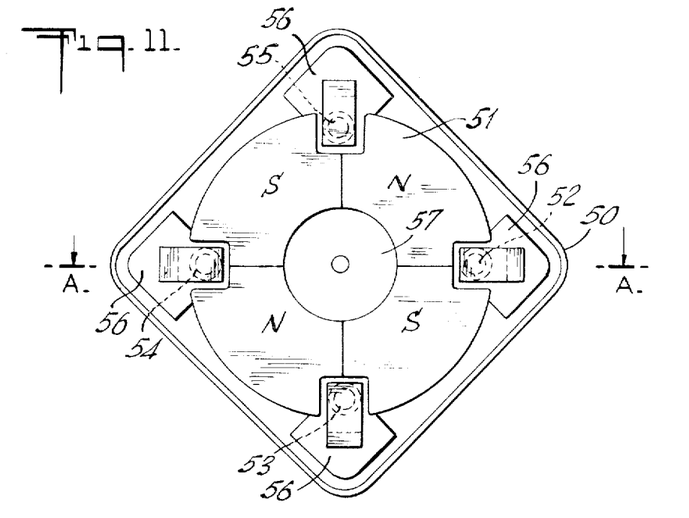
FIG. 11 is an elevational view of a four pole motor in accordance with the invention having an axial air gap, the top half of the motor being removed in this figure for clarity in the showing of the internal components.
Figure 12:
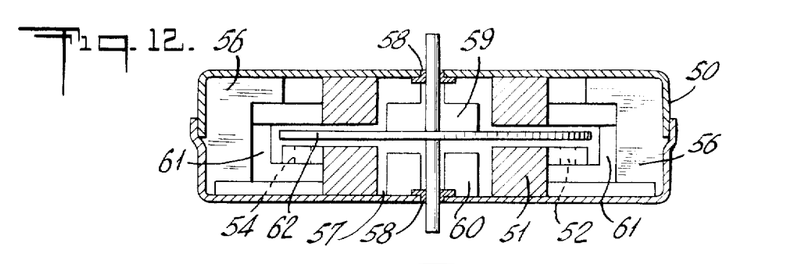
FIG. 12 is a cross-sectional view of the motor of FIG. 11 taken along the lines A—A, the view of FIG. 12 including the components of the half of the motor omitted in FIG. 11.

FIG. 11 is a view of the lower portion of the stator of a four pole motor, a complete cross section of the motor including the rotor and the upper stator portions being illustrated in FIG. 12. In this arrangement, an oxidized ceramic ring magnet 51 having two pairs of poles is mounted in a housing 50 made of any material, but preferably made of a magnetically conductive material such as sheet iron.

Ferrite core coils 52–55, which serve as the field poles having alternating polarity fields, are disposed in recesses in the ring magnet 51, i.e. in the pole boundaries of the magnet. The coils 52–55 are adequately spaced from the housing 50, as illustrated in FIG. 12. By designing the housing 50 to have a square shape, sufficient space is left in the corners of the housing near the ferrite core coils 52–55 to accommodate the generator components. These components are indicated generally as blocks 56. The inside space 57 of the ring magnet is sufficiently large to provide room for the bearings 58 (see FIG. 12), rectifying means 59, and also possibly such devices as tachgenerators and similar devices 60.

The cross sectional view of FIG. 12 thus illustrates the manner in which the inside space 57 of a motor may be utilized, how a magnetic return path may be provided, and the manner in which the generator component blocks may be mounted. This figure shows that the ferrite core coils 52, 54 also have return path components 61, for example in the form of return path cores. The efficiency of the motor is also improved by arranging the generator coils, not perhaps on the return path part 61, but on the cores 52, 54 as close as possible to the rotor drive coil plate 62. Otherwise, stray fields may have an undesirable influence on the effective coupling of energy to the drive coils, considering the fact that the frequencies employed in the operation of the motor are preferably high.

Figure 13:
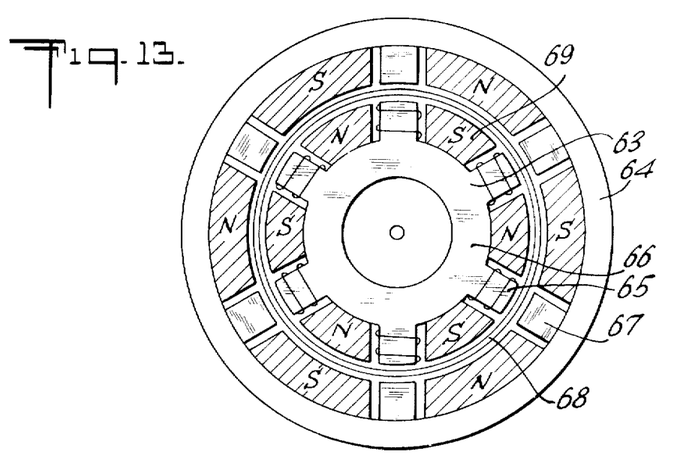
FIG. 13 is a cross-sectional view of a six pole motor in accordance with the invention, this motor having a radial air gap.

FIG. 13 is a cross sectional view of a six pole motor in accordance with the invention having a radial gap. The inside portion 63 as well as the outside portion 64 of the stator consists of a magnetically conductive material. For example, both of these components may be in the form of ferrite stampings. The generator coils are wound on the projections 65 on the inside stator portion 63. The generators may be disposed in the interior space 66 beside the bearings of the motor. The generator coils may also be wound on the projections 67 of the outside stator position 64, unless technological difficulties are encountered by this technique when the dimensions of the motor are too small. The drive coils (not shown) are provided on the rotor ring 68, the ends of the rotor ring 68 being mounted on suitable bearings. Oxidized ceramic magnetic segments 69, which are radially magnetized, are inserted in the interspaces of both stator portions 63 and 64.

It is possible to produce an entire motor in accordance with the invention by stamping, molding, sintering and similar techniques, and in conjunction with the use of integrated circuits and the design of the motor as an axial air gap motor, the invention enables the production of a motor with extremely low costs and having excellent characteristics. Motors of this type are illustrated in FIGS. 14–17.

Figure 14:
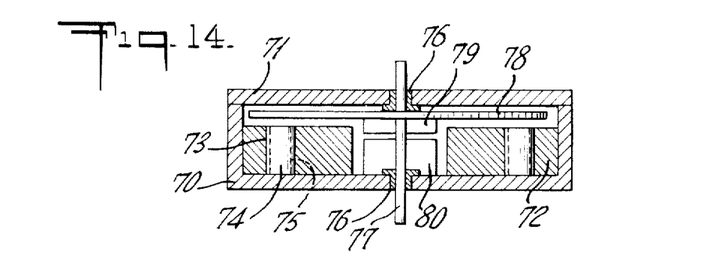
FIG. 14 is a cross-sectional view of an eight pole motor in accordance with the invention, this motor having an axial air gap.

FIG. 14 illustrates in cross sectional view a simple motor in accordance with the invention. The motor housing is formed of a cup 70 and a cover 71 of ferrite material. If desired, two identical cups may also be employed, the separating line of the two cups being located centrally with respect to the axial dimension of the motor. An oxidized ceramic magnet ring 72 is inserted in the cup 70. This ring may be retained magnetically, or alternatively it may be pressed into the cup, or cemented or fastened by any other known technique to the cup 70. The ferrite cores 74 are provided in recesses 73 of the magnet ring 72. The cores 74 may either be an integral part of the cup 70, or they may be pressed into the cup or otherwise joined thereto in a known manner. The ends of the cores 74 are flush with the faces of the magnet ring 72, and these cores support generator windings 75. The windings 75 are also flush with the ends of the cores 74. The cup 70 and the cover 71 are provided with central bearings 76 for the rotor 77. The rotor plate 78 containing the rectifying means 79 is provided in the vicinity of the shaft, i.e. in the area not occupied by the magnet ring 72. Remaining free spaces in the motor, as indicated by the component block 80, may contain the generator components and a tachgenerator.

Figure 15:
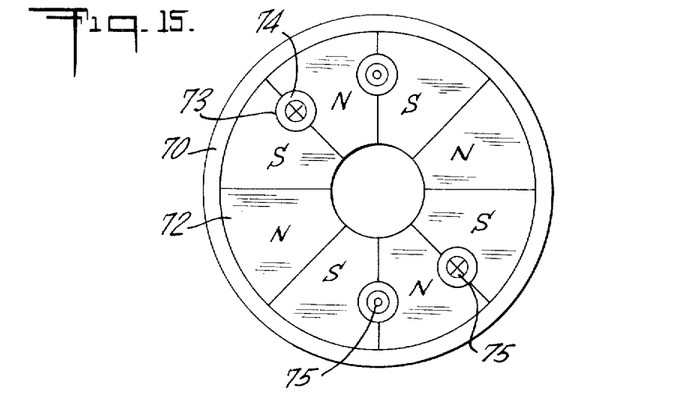
FIG. 15 is a top view of the stator of the motor of FIG. 14.

FIG. 15 illustrates a top view of the motor of FIG. 14 with the cover 71 and the rotor removed. The arrangement illustrated in FIG. 15 is an eight pole motor. The generator coils for the different directions of rotation are differentiated by dots or crosses in the center thereof. When different numbers of poles are employed, the form of the system will be the same, in that the poles of alternating polarity magnetic field disposed between the pole sequence S-N determines one direction of rotation and the poles of alternating polarity magnet field disposed between the pole sequence N-S determines the other direction of rotation of the motor. Usually, as discussed above, two poles of alternating polarity magnetic field are provided for each direction of rotation. This number of poles of alternating magnetic polarity need not be increased as the number of poles of the motor is increased, if appropriate rotor circuits are employed.

Figure 16:
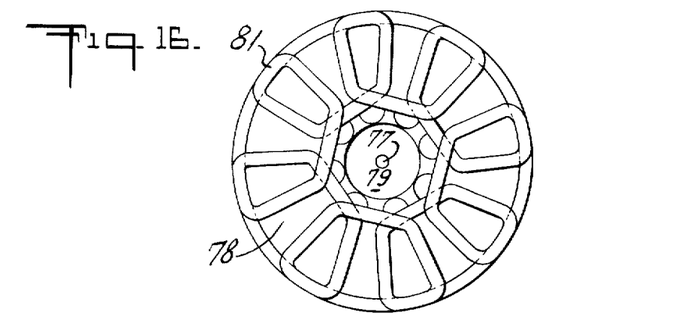
FIG. 16 is an elevational view of a rotor plate for the motor of FIG. 15.

FIG. 16 illustrates the rotor of the eight pole motor of FIGS. 14 and 15. The type of winding to be employed may be arbitrarily selected, and may thus differ in known manner from the rotor illustrated. The drive coils are so disposed on the rotor plate 78 that overlaps occur only outside of the active pole areas, i.e., only in the free center region in the type of winding illustrated. If overlaps also occur at the outer edge, they may be accommodated, in known manner, by providing a depression between the magnet ring 72 and the cup 70. The rectifying means 79 are mounted in the center region surrounding the rotor shaft 77. The rectifying means may be cast in place in order to provide better balancing of the motor, and to avoid damage due to centrifugal forces.

Figure 17:
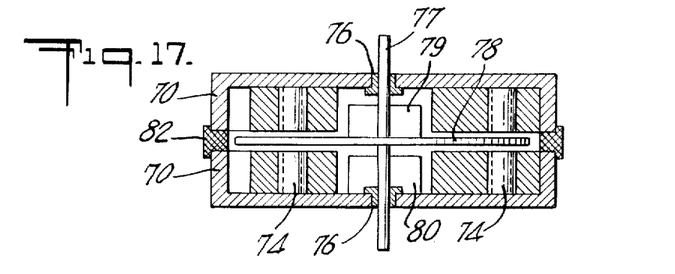
FIG. 17 is a cross-sectional view of a modified form of the motor in accordance with FIG. 14.

FIG. 17 illustrates an improved modification of the motor, which due to the double arrangement of the magnet poles, has improved return path properties and smaller stray losses. In this arrangement, identical elements are marked with identical reference symbols as employed in FIG. 15-17. If possible, the stator assembly is formed of two completely identical parts, so that the entire stator requires the use of no more than two to three dies for molding, stamping, casting, or the like. In addition to the requirement of a winding machine for the coils on the rotor plate 78, the rotor additionally requires the use of a combination fixture for assemblying, balancing and stiffening. Standardized parts may be employed for the shaft 77 and the bearing 76. An intermediatary ring 82 is provided between the housing cups 70 in order that machining of the entire stator surface facing the rotor is possible. Such machining may be accomplished, for example, by surface grinding. The intermediary ring 82 may also form part of one of the cups 70 or may belong in part to both of the cups 70, by employing an insert in the die or mold. Alternatively, both of the cups may simply be made with an initial central separating joint having a ring or axial screws, cement or the like for holding the parts together, when the motors do not require great accuracy with respect to the dimensions of the air gap. By this technique the machining, for example by chip removal, can be entirely avoided, thereby permitting uncomplicated techniques for the mass production of motors having excellent properties. Other known methods and variations may, of course, be employed in the design and fabrication of the motor.

While the invention has been disclosed and described with reference to a limited number of embodiments, it will be apparent that many variations and modifications may be made within the scope of the invention, and it is thereby intended in the following claims to cover each such variation and modification as falls within the true spirit and scope of the invention.

What is claimed is:

1. A commutatorless motor comprising an iron-free rotor having drive coils and rectifying means connected to the drive coils, and a stator comprising poles of constant magnetic field strength arranged with alternating polarity, pole means adapted to provide an alternating magnetic field and mounted between poles of constant magnetic field strength, and coil means on said pole means, said coil means comprising means for coupling energy to the motor for driving said rotor, said drive coils being the sole coils on said rotor.

2. A commutatorless motor comprising an iron-free rotor having drive coils and rectifying means, a stator comprising poles of constant magnetic field strength arranged with alternating polarities, pole means adapted to provide an alternating magnetic field mounted between poles of constant magnetic field strength, and coil means on said pole means, a source of AC voltage of a frequency greater than the rotational frequency of said motor, and means connecting said source solely to said coil means for applying driving energy to said motor, said drive coils being the sole coils on said rotor, said drive coils being interconnected with said rectifying means whereby said drive coils function simultaneously as energy coupling and control coils.

3. The commutatorless motor of claim 2, wherein said poles of constant magnetic field strength are comprised of a substantially closed ring of constant field strength poles, and said pole means comprises at least one stator pole mounted between the boundaries of poles of constant magnetic field strength.

4. The commutatorless motor of claim 3, wherein said ring is comprised of an oxidized ceramic magnetic material and said stator pole is comprised of a ferrite core and an energizing coil wound thereon.

5. The commutatorless motor of claim 2 wherein said drive coils comprise first and second drive coil means, means interconnecting one end of each of said drive coil means directly, and means connecting the other ends of said drive coil means by way of said rectifying means.

6. The commutatorless motor of claim 5 in which said rectifying means comprises controlled rectifying means, wherein said controlled rectifying means is connected to said coil means wherby at any instant one of said coil means controls the direct current flowing through both of said coil means.

7. The commutatorless motor of claim 2 wherein said AC voltage source comprises high frequency generator means having a load dependent current output.

8. The commutatorless motor of claim 7 wherein said coil means on said stator comprise generator coil means in said high frequency generator means.

9. The commutatorless motor of claim 2 wherein said stator is comprised of ferrite material and forms a motor housing and a return path for magnetic fields, and wherein said poles of constant magnetic field strength are comprised of an oxidized ceramic magnetic material mounted within said housing.

10. The commutatorless motor of claim 2 wherein said coil means are positioned close to said drive coils, the pole faces of said pole means being in a common plane, the pole cores of said pole means including said drive coils as a return path for alternating field flux.

11. The commutatorless motor of claim 2 wherein said source comprises a plurality of AC voltage generators, and wherein said pole means comprises at least twice as many stator poles as said generators, said stator poles being mounted at the boundaries between poles of constant magnetic field strength.

12. The commutatorless motor of claim 2 wherein said pole means comprises a pair of stator poles positioned diametrically oppositely in said motor, said source being connected to the coil means on said stator poles.

13. The commutatorless motor of claim 2 wherein said source of voltage comprises a pair of AC voltage generators, said pole means comprising a plurality of stator poles mounted at the boundaries of poles of constant magnetic field strength, and further comprising means for selectively connecting said generators to the coil means on said stator poles for controlling the direction of rotation of said rotor.

14. The commutatorless motor of claim 2 wherein said source comprises regulating means for controlling the revolutions of said rotor.

15. The commutatorless motor of claim 14 wherein said AC voltage source comprises a pair of AC voltage generators corresponding to different directions of rotation of said rotor, and means for selectively coupling said generators to said coil means for controlling the direction of rotation of said rotor.

16. The commutatorless motor of claim 2 wherein said drive coils are mounted in respectively overlapping positions.

17. The commutatorless motor of claim 2 wherein said drive coils and rectifying means comprise an integrated component.

18. The commutatorless motor of claim 2 wherein said drive coils are comprised of printed circuits.

19. The commutatorless motor of claim 2 further comprising a stator housing comprised of a pair of cups coaxially mounted with facing open ends, said pole means comprise pole cores mounted within said cups and extending parallel to the axis thereof with the axial dimension of each pole core being shorter than the internal axial length of the corresponding cups, said poles of constant magnetic field strength comprising a ring mounted within said cups and having recesses through which said pole cores extend, and wherein said rotor is disc shaped.

20. The commutatorless motor of claim 19 further comprising a shaft bearing coaxially mounted in each of said cups, said rotor comprising a shaft rotatably mounted in said shaft bearings, said rectifying means being mounted on said rotor adjacent said shaft and within said ring.

21. The commutatorless motor of claim 2 further comprising a stator housing, said stator being mounted within said housing, said housing further having recesses within which said source is mounted, whereby the only external leads from said motor are comprised of DC supply leads connected to said source and control lead means for controlling said source.

* * * * *